United States Patent [19]

Kraus et al.

[11] 3,856,624
[45] Dec. 24, 1974

[54] PROTEIN MOLECULAR PROSTHESIS MEDIATED BY CARBAMYL PHOSPHATE AND CARBAMYL PHOSPHATE DERIVATIONS

[75] Inventors: Alfred P. Kraus; Lorraine M. Kraus; John L. Wood, all of Memphis, Tenn.

[73] Assignee: The University of Tennessee Research Corporation, Knoxville, Tenn.

[22] Filed: Sept. 18, 1972

[21] Appl. No.: 289,942

[52] U.S. Cl. .................................. 195/1.8, 424/211
[51] Int. Cl. ............................................ A61k 27/00
[58] Field of Search ..................................... 195/1.8

[56] References Cited
OTHER PUBLICATIONS

Kraus et al., Biochemical and Biophysical Research Communications, Vol. 44, No. 6, pages 1381–1837, Sept. 17, 1971, QP 501 B43.

Primary Examiner—Richard L. Huff
Attorney, Agent, or Firm—Cameron, Kerkam, Sutton, Stowell & Stowell

[57] ABSTRACT

The sickling of red blood cells in the blood of humans afflicted with sickle cell anemia is inhibited by the treatment of said blood with carbamyl phosphate.

10 Claims, 6 Drawing Figures

PROTEIN MOLECULAR PROSTHESIS MEDIATED BY CARBAMYL PHOSPHATE AND CARBAMYL PHOSPHATE DERIVATIONS

BACKGROUND OF THE INVENTION

It has been heretofore proposed to inhibit the sickling of erythrocytes in human blood containing hemoglobin S utilizing urea [Nalbandian Ed. (1971) *Molecular Aspects of Sickle Cell Hemoglobin*, Charles C. Thomas Company, Springfield, Illinois; McCurdy et al. (1971) *Urea Therapy for Sickle Cell Disease*, Clin. Res. 19:75] and Cyanate [Cerami et al. (1971), *Potassium Cyanate as an Inhibiter of the Sickling of Erythrocytes in vitro*. Proc. Nat. Acad. Sci. U.S.A. 68; 1180.] The successful treatment of sickling with urea is said to be predicated on the fact that urea acts reversibly by interfering with the hydrophobic bonding of hemoglobin molecules. On the other hand, cyanate is reported to act irreversibly through the carbamylation of the amino terminal valines in the hemoglobin molecule.

SUMMARY OF THE INVENTION

The invention is predicated on the discovery that the sickling of erythrocytes or red blood cells in the blood of humans afflicted with sickle cell anemia (i.e., containing hemoglobin S) is inhibited by the treatment of said blood with carbamyl phosphate. The said treatment is preferably carried out by incubating the patient's whole blood containing hemoglobin S with a saline solution of carbamyl phosphate.

DETAILED DESCRIPTION OF THE INVENTION

Figure 2:
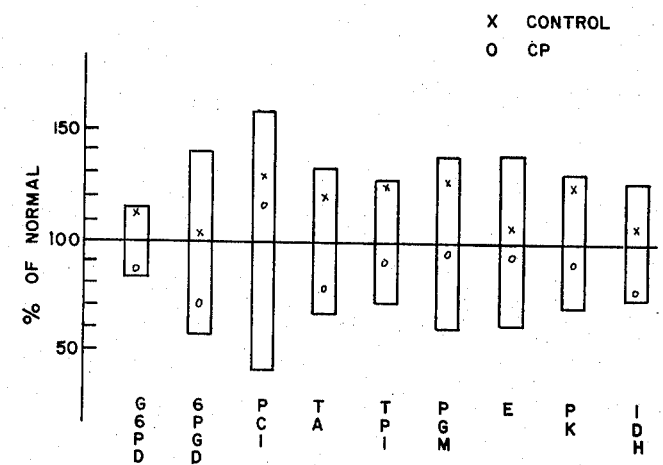

Carbamyl phosphate is a normal constituent of the human organism and is synthesized in the body by carbamyl phosphate synthetase from ammonia, carbon dioxide and ATP. Carbamyl phosphate initiates the urea cycle in the body, resulting in the synthesis of urea, arginine and the pyrimidine ring. Carbamyl phosphate exists in the dianionic form in aqueous solution at blood pH. According to Allen et al. (Biochemistry Vol. 3, page 1238, 1964), the carbamyl phosphate dianion decomposes through a mono-molecular elimination of cyanic acid. Cyanic acid is then ionized to the stable cyanate ion. Carbamyl phosphate has a half life of 40 minutes in aqueous solution at body pH and 37°C. The reactions involved in its decomposition are as follows:

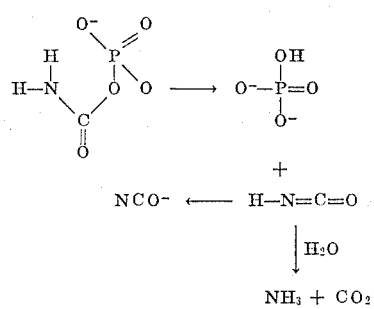

It is to be understood, however, that the treatment of blood containing hemoglobin S with carbamyl phosphates amounts to more than merely providing a new route for the introduction of cyanate ion *in situ* to inhibit sickling in accordance with the method of Cerami and Manning. As will be apparent from the disclosure hereinafter, the phosphate moiety of the carbamyl phosphate plays an important role in the sickling inhibition phenomenon.

The preferred method comprises incubating whole blood with carbamyl phosphate *in vitro*. Preferably, a volume of plasma equivalent to the volume of carbamyl phosphate solution to be added to the whole blood is first removed from the blood. An equivalent volume of saline solution of carbamyl phosphate is then added to the whole blood to provide a molar ratio of carbamyl phosphate to hemoglobin in the preferred range of from about 4:1 to about 16:1. It is preferred to employ a saline solution (i.e., 0.14M NaCl) up to about 0.25 molar with respect to carbamyl phosphate, it being understood that the solution may have any concentration desirable. The incubation is conducted at about 37°C; it being understood that the temperature of incubation is not overly critical and may be conducted at any temperature from about 0° to about 40°C. Sickling inhibition is achieved after incubation for any length of time. It is preferred, however, to conduct the incubation for a period of from about 30 to about 120 minutes.

Although the preferred molar ratio of carbamyl phosphate to hemoglobin is from about 4:1 to about 16:1, it is to be understood that other amounts may be employed. Since the preferred procedure comprises first extracting a volume of plasma equivalent to that of the saline solution of carbamyl phosphate added, it will be apparent that the employment of larger amounts of carbamyl phosphate will entail the extraction of equally large amounts of plasma. While the process is operable where substantially all of the plasma has been extracted from the blood, it is generally desirable to withdraw as little plasma as possible in order to maintain a stable environment for the erythrocytes.

The carbamyl phosphate is preferably employed as a soluble salt with the di-alkali metal salts being the most preferred, i.e., di-lithium, di-sodium, di-potassium, etc.

It has been found that the inhibition of the sickling phenomenon is enhanced when employing whole blood containing substantially deoxygenated erythrocytes. More particularly it has been found that the effect is even more pronounced when the blood is deoxygenated during the incubation cycle. The inhibition effect is approximately two-fold when employing deoxygenated blood as opposed to oxygenated blood. Moreover, it has been found that the method of the invention is enhanced still further by the aging or storing of the whole blood prior to the *in vitro* addition of carbamyl phosphate. Thus, the sickling inhibition effect is much more pronounced where the whole blood is stored for periods of from about 1 hour to 32 days, preferably 24 to 48 hours after withdrawal from the patient and prior to the introduction of carbamyl phosphate.

While not wishing to be bound by any theory, the following mechanism is offered to explain the erythrocyte sickling inhibition effect of carbamyl phosphate in whole blood. Benesch et al. [Fed. Proc. Vol. 29, page 1109 (1970)] established that there is a phosphate binding site in hemoglobin at the amino terminal valine residue of the beta chain of the hemoglobin tetramer. See also Bunn, International Congress of Biochemistry, Abstract: 7 (1970). This phosphate binding site is normally occupied by 2,3-diphosphoglycerate (DPG) which binds with deoxyhemoglobin and not with oxyhemoglobin. It is theorized that when oxygen is released from the hemoglobin molecule the carbamyl phosphate competes with DPG for the site within the hemoglobin tetramer. The storage of whole blood also decreases the amount of 2,3-DPG present therein (Bunn et al, J. Clin. Invest. Vol. 48, page 311) (1969), thereby enhancing the reaction between carbamyl phosphate and the hemoglobin molecules. Once located in a position within the hemoglobin molecule, the carbamyl phosphate undergoes a mono-molecular elimination according to the reaction scheme set forth above to yield the stable cyanate ion *in situ*. The cyanate ion is now in a position to carbamylate the $NH_2$ terminal residues of the meloglobin chains which apparently operates to relieve the sickling phenomenon. As is apparent from the comparative tests set forth below, however, it is necessary for the carbamyl phosphate to bind to the hemoglobin molecule prior to release of the cyanate ion in order to achieve sickling inhibition.

Charache et al. [J. Clin. Invest., Vol. 49, page 806 (1970)] have shown that the DPG concentrations of whole blood are higher in sickle cell anemia patients than they are in normal individuals and that there is a considerable variation in the DPG values between patients. This absence of DPG in the sickle cell anemia patient's blood accounts for the enhanced receptivity thereof to carbamyl phosphate.

The importance of the phosphate moiety is emphasized by the fact that the *in vitro* incubation of whole blood with a solution of carbamyl phosphate which has been preliminarily decomposed to the cyanate ion does not alter the sickling characteristics of the red blood cells. Thus, it would appear to be necessary that the carbamyl phosphate react with or be bound to the hemoglobin molecules prior to release of the stable cyanate ion in order to achieve sickling inhibition.

Carbamyl phosphate has been found to inhibit the *in vitro* sickling of hemoglobin S erythrocytes in whole blood from patients with sickle cell anemia in crisis or in steady state of the disease. The thus treated blood may be stored for future use or immediately reintroduced into the patient afflicted with the disease either to relieve or prevent further crisis. The following non-limiting examples are illustrative of the invention.

In the examples which follow, the following materials and methods were employed.

Blood from patients with sickle cell disease was collected in EDTA (1 Mg/ml of blood) and maintained at 25°C. for immediate use or stored at 4°C. for future use. The hematocrit was adjusted to 30% giving a final hemoglobin concentration ranging from 1.38 to 1.68 mM. The main corpuscular hemoglobin concentration ranged from 29.8% to 36.2%.

Carbzmyl phosphate (dilithium salt monohydrate, Sigma Chemical Co., St. Louis — 95% pure) was employed as a solution of 0.222 M carbamyl phosphate in 0.14 M NaCl. The solution was prepared immediately prior to incubation.

Potassium cyanate (J. T. Baker Chemical Company — 97.5% pure) was employed as a 1.979 M solution in 10% invert sugar.

Sodium metabisulfite was employed as a 0.2 g/10 ml $H_2O$ solution.

Formalin — saline solution was prepared as 10% formaldehyde in 0.14 M saline and equilibrated with 95% $N_2$ 5% $CO_2$ or air to match the gas phase of the erythrocytes.

An aliquot of each adjusted blood sample was removed to serve a future control. A volume of plasma was removed and replaced with an equal volume of reagent used in the experiment.

EXAMPLE 1

Incubation with Carbamyl Phosphate

Carbamyl phosphate (0.1 or 0.2 ml of a 0.222 M solution was added to the blood to make a final volume of 3.5 ml of oxygenated whole blood. The blood was immediately incubated at 37°C. in a shaking water bath in room air or in an atmosphere of 95% $N_2$ 5% $CO_2$ for 30, 45, 60 and 120 minutes. The oxygenated samples were deoxygenated by removing the ambient atmosphere using a water aspirator briefly and equilibrating the samples with the 95% $N_2$ 5% $CO_2$ gas mixture for 12 minutes. To examine the carbamyl phosphate effect on incubated deoxygenated blood, the deoxygenated samples were oxygenated by equilibration with air through general rotation of the blood, then the blood was deoxygenated as described above for 12 minutes.

Aliquots of blood were removed into Formalin — saline which had been equilibrated with the appropriate gas mixture at the end of each incubation period, and after the blood was oxygenated and/or deoxygenated as the procedure required. The Formalin-saline fixed the erythrocytes shapes for future measurement of the sickling phenomenon. In some instances, sealed, moist preparations of erythrocytes were made in saline or sodium metabisulfite for assay of sickling.

To test the carbamyl phosphate effect, carbamyl phosphate in 0.14 M NaCl solution was subjected to conditions which would theoretically convert 87% to cyanate, i.e., incubation at 37°C. for 120 minutes at pH 6.4. Immediately thereafter, aliquots of the same blood samples and the aged carbamyl phosphate solution were incubated at air at 37°C. for 120 minutes following the procedure used when the same solution of carbamyl phosphate was freshly prepared.

In each instance, the ratio employed was 1 mole of hemoglobin per 8 moles of freshly prepared carbamyl phosphate or decomposed carbamyl phosphate. Samples of oxygenated and deoxygenated blood were taken for assay of sickled cells.

Controlled experiments were conducted in each instance using aliquots of the same blood sample without the addition of carbamyl phosphate. These were handled in a manner identical to the blood treated with carbamyl phosphate. The erythrocytes were examined by counting at least 200 cells using an American Optical Company phase microscope (X 400) and checked using oil emission (X 1000). Sickled erythrocytes were identified by the distortion of the cell membrane. Only biconcave, undistorted erythrocytes were considered unsickled. The number of unsickled cells per 100 erythrocytes were recorded. The results set forth in Tables 1 and 2:

TABLE 1

Effect of carbamyl phosphate on the sickling of deoxygenated erythrocytes* after incubation in 95% $N_2$ 5% $CO_2$ at 37° expressed as per cent normal (unsickled) erythrocytes

| 37° minutes | moles Carbamyl phosphate/mole Hb | | | | | | | | | |
|---|---|---|---|---|---|---|---|---|---|---|
| | 0/1 | | | 4/1 | | | | 8/1 | | |
| 45 | a | b | c | a | b | c | d | a | b | c | d |
| Pt. 1 | 48 | 98 | 66 | 44 | 98 | 78 | (12) | 58 | 97 | 99 | (33) |
| 60 | | | | | | | | | | | |
| Pt. 3 | 12 | 97 | 70 | | | | | 24 | 99 | 85 | (15) |
| Pt. 4 | 29 | 82 | 61 | | | | | 21 | 96 | 83 | (22) |
| Pt. 5 | 24 | 93 | 50 | | | | | 17 | 91 | 81 | (31) |
| PPt. 6ʳ | 12 | 94 | 75 | | | | | 27 | 94 | 80 | (5) |
| 120 | | | | | | | | | | | |
| Pt. 3 | 10 | — | 57 | | | | | 20 | — | 86 | (29) |
| Pt. 4 | 26 | 87 | 42 | | | | | 38 | 96 | 69 | (27) |
| PPt. 5 | 21 | 96 | 49 | | | | | 37 | 77 | 81 | (31) |
| Pt. 6ʳ | 3 | 95 | 20 | | | | | 16 | 87 | 83 | (63) |

*Formalin-saline fixed preparations.
a Sample taken at the termination of incubation in 95% $N_2$ 5% $CO_2$.
b Sample taken after reoxygenation in air.
c Sample taken after deoxygenation for 12 minutes in 95% $N_2$ 5% $CO_2$.
d Difference in number of normal (unsickled) erythrocytes - control from treated.
ʳBlood sample stored at 4° for 48 hours before use.
Pt. Patient with sickle cell disease

TABLE 2

Effect of carbamyl P on the sickling of deoxygenated erythrocytes* after incubation in air at 37° expressed as per cent normal (unsickled) erythrocytes

| 37° minutes | moles Carbamyl P/mole Hb | | | | | | |
|---|---|---|---|---|---|---|---|
| | 0/1 | | 4/1 | | | 8/1 | |
| 45 | air | a | air | a | b | air | a | b |
| Pt. 1 | 98 | 32 | 97 | 77 | (45) | 98 | 76 | (44) |
| Pt. 2 | 88 | 44 | 93 | 85 | (41) | 95 | 75 | (31) |
| 60 | | | | | | | | |
| Pt. 3 | 98 | — | | | | 99 | 65 | — |
| Pt. 4 | 94 | 54 | | | | 96 | 65 | (11) |
| Pt. 5 | 96 | 32 | | | | 97 | 34 | (3) |
| Pt. 6ˣ | 97 | 48 | | | | 89 | 66 | (18) |
| 120 | | | | | | | | |
| Pt. 3 | 98 | — | | | | 99 | 89 | — |
| Pt. 4 | 96 | 37 | | | | 89 | 54 | (17) |
| Pt. 5 | 91 | 21 | | | | 88 | 42 | (21) |
| Pt. 6ˣ | 87 | 30 | | | | 85 | 84 | (54) |

* Formalin-saline fixed preparations.
a Sample taken after deoxygenation for 12 minutes in 95% $N_2$ 5% $CO_2$.
b Difference in number of normal (unsickled) erythrocytes-control from treated.
ʳBlood sample stored at 4° for 48 hours before use.
Pt. Patient with sickle cell disease Carbamyl phosphate inhibits the *in vitro* sickling usually seen following deoxygenation of blood from sickle cell anemia patients. In blood deoxygenated immediately upon the addition of carbamyl phosphate, the effect is maximal in 60 minutes at 37°C. (See Table 1); whereas the same effect is oxygenated blood from some patients requires approximately twice the time (See Table 2).

Figure 1:
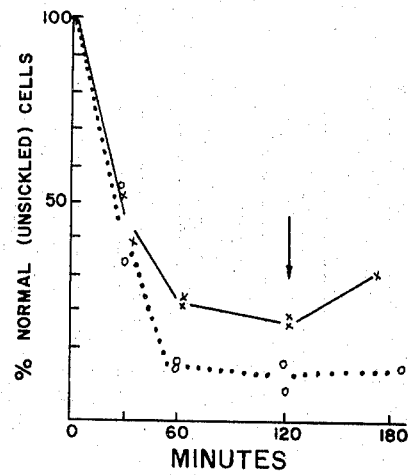

The number of sickled erythrocytes formed is time dependent in the system of deoxygenation employed (See FIG. 1), reaching a maximum of sickling after one hour in the untreated samples. In FIG. 1 the effect of carbamyl phosphate upon sickling during incubation of erythrocytes in 95% $N_2$ 5% $CO_2$ at 37°C. is expressed. Whole blood (0) and whole blood carbamyl phosphate (X) (8 moles carbamyl phosphate per mole Hb) was assayed for the percent of normal (unsickled) erythrocytes by counting erythrocytes fixed in oxygenated formalin-saline. The arrow indicates the addition of 0.2 ml of oxygenated plasma to whole blood and to whole blood with carbamyl phosphate. It can be seen from FIG. 1 that sickling reaches a maximum after one hour in the untreated samples. After two hours, there are fewer sickled cells in a treated deoxygenated blood than there are in the deoxygenated controlled blood samples thus indicating an inhibition of sickling under the stated conditions.

There was no measurable effect in the inhibition of sickling upon deoxygenation of the erythrocytes when the heat degraded carbamyl phosphate was incubated with oxygenated blood — 8 moles per mole of hemoglobin for two hours. The number of sickled cells was the same as that found in the control blood. However, the companion samples incubated with the carbamyl phosphate when it was freshly prepared contained 20% more cells with a normal morphology.

The variation between the effect of carbamyl phosphate on blood used within 24 hours of drawing the sample and that stored at 4°C. for 48 hours (Tables 1 and 2) would appear to suggest that aging of the red cells may deplete or change the concentration of a molecule which is involved in the carbamyl phosphate effect, i.e., DPG. In the aged blood the inhibition of sickling of the erythrocytes is enhanced two-fold. Furthermore, since the carbamyl phosphate effect is more marked in the deoxygenated cells than in the oxygenated cells, and since it requires more time to achieve an effect upon the oxygenated erythrocyte, it would appear that there is a difference related to the conformation of hemoglobin in the oxygenated molecule as opposed to the deoxygenated molecule. Thus, the theory with respect to the binding of the phosphate moiety of carbamyl phosphate to the hemoglobin molecules set forth above would appear to the confirmed.

EXAMPLE 2

Incubation With Potassium Cyanate

An aliquot of each adjusted blood ssample was removed to serve as its own control. Potassium cyanate was added to whole blood (hematocrit 30) in a 1:1 mixture of blood and 10% inverse sugar as 4/1, 8/1, 40/1 and 80/1 moles of cyanate per mole of hemoglobin. The blood was incubated in 95% $N_2$ 5% $CO_2$ for 30 minutes at 37°C. The blood was then reoxygenated. Similar samples of blood were incubated with carbamyl phosphate according to the same procedure. The ability of erythrocytes to sickle was evaluated in sealed moist preparation in saline or in 2% sodium metabisulfite. The results are set forth in Table 3:

TABLE 3

Comparison of the effects of potassium cyanate and carbamyl phosphate on sickling of deoxygenated erythrocytes following incubation in 95% $N_2$ 5% $CO_2$ at 37° for 30 minutes expressed as per cent normal (unsickled) erythrocytes

| Patient | 0/1 | 4/1 | 8/1 | d | 40/1 | d | 80/1 | d |
|---|---|---|---|---|---|---|---|---|
| | | | moles Potassium cyanate/mole Hb | | | | | |
| 7[a] | 67 | 67 | | (0) | 75 | (8) | | |
| 8[b] | 8 | | 17 | (9) | | | 93 | (85) |
| 9[b] | 5 | | | | | | 99 | (94) |
| 9[c] | 1 | | | | | | 36 | (35) |
| | 0/1 | 4/1 | 8/1 | | | | | |
| | | | moles carbamyl phosphate Hb | | | | | |
| 9[c] | 1 | 45 | (44) | | | | | |
| 10[c] | 24 | | 52 | (26) | | | | |
| 11[c] | 32 | | 63 | (31) | | | | |
| 12[c] | 25 | | 56 | (31) | | | | |
| 3[c] | 38 | | 50 | (12) | | | | |

[a] Deoxygenated in 3% $O_2$ 5% $CO_2$ 92% $N_2$. Formalin-saline preparation. Blood samples oxygenated and then moist, sealed preparations of erythrocytes prepared in (b) saline, and (c) sodium metabisulfite. Cells scored after 16 hours.

[d] Difference in number of normal (unsickled) erythrocytes - control from treated.

It is apparent that carbamyl phosphate is much more effective in the inhibition of sickling than is cyanate ion alone.

In the examples which follow, the following materials and methods were employed:

Blood from patients with sickle cell anemia (Hb SS) was collected by venipuncture into heparin or EDTA (1 mg/ml of blood). The blood was kept at 4°C until used, either within 24 hours of collection or at 48 hours after collection. The hematocrit and hemoglobin concentration were determined.

Carbamyl phosphate as the dilithium salt (Sigma Chemical Co., St. Louis, purity 98%) was employed to make a solution of 0.222 M carbamyl phosphate 0.14 M NaCl immediately before use. Carbamyl phosphate with $^{14}C$ label, (New England Nuclear Corp.) was added to nonlabeled carbamyl phosphate so that the final solution was 0.222 M and had a specific activity of $4.8 \times 10^5$ cpm per $\mu$mole of carbamyl phosphate.

Potassium cyanate (J. T. Baker Chemical Co., 97.5% pure) was prepared as a 0.222 M solution in 0.14 M NaCl. Potassium cyanate with $^{14}C$ label (International Chemical and Nuclear Corp., Irvine, Calif.) was added to nonlabeled potassium cyanate to make a final solution of 0.222 M with a specific activity of $3.9 \times 10^5$ cpm per $\mu$mole of potassium cyanate.

Prior to the addition of a solution of any reactant an equivalent volume of plasma was removed from the blood. The reactant was added to blood as 8 moles of each reactant per mole of hemoglobin. The mixture of blood and reactant was incubated at 37°C in a shaking $H_2O$ bath for varying time intervals. At the end of incubation the blood was chilled, the plasma removed and the cells washed three times with 0.14 NaCl. Cell hemolysate was prepared by the method of Drabkin (J. B. Chem. Vol. 164, p. 703, 1946).

Hemoglobin electrophoresis on vertical starch gel (Smithies, Biochem. J. Vol. 71, Pg. 585, 1959), using Tris EDTA Borate buffer pH 8.6, 0.05 M (Boyer, et al., Science, Vol. 140, pg. 1228, 1963), was used to separate the different species of hemoglobin S found in treated blood. Radioactivity of hemoglobin was measured in the starch gel following electrophoretic fractionation by cutting, drying and counting the gel sections.

Globin was prepared using the method of Anson and Mirsky, J. Gen. Physiol., Vol. 13, p. 469 (1930).

The polypeptide chains of globin were separated using carboxymethyl cellulose column chromatography according to the mthod of Clegg et al., Nature, Vol. 207, p. 945 (1965). The chains were dialyzed, lyophilyzed, weighed and the radioactivity measured. The specific activity as mole of $^{14}C$ incorporated per mole of chain was calculated.

Tryptic digestion of the globin followed by peptide mapping of the soluble tryptic digest was done according to the method of Ingram Biochem. Biophys. Acta. Vol. 28, p. 539 (1958) (1958). Autoradiograms of the peptide maps were prepared using Kodak Safety Film, RPRoyal X-Omat film. In equivalent experiments the films were exposed for identical times.

Peptides located by autoradiogrphy or by ninhydrin reaction were counted to assess their radioactivity.

Amino acid analysis of isolated chains and peptides was done on the Technicon TSM Amino Acid Autoanalyzer.

Radioactivity was measured in a Nuclear Chicago Mark II liquid scintillation system.

Red cell enzymes were measured by the methods described by Kraus, et al. Biochem. Biophys. Res. Com. Vol. 30, p. 173 (1968).

The $^{51}Cr$ red cell survival studies were done as described by the International Committee for Standardization in Hematology 1971. (Blood, Vol. 38, No. 3, Sept. 1971, pp. 378–386).

The results of tests for red blood cell antigens were the same for carbamyl phosphate treated cells and for the untreated controls. The systems tested were A, B, O; C, D, E, c, e; K, k, $Kp^a$, $Kp^b$; $Fy^a$, $Fy^b$, $Jk^a$ and M, N, S, s, U.

EXAMPLE 3

Red cell enzymes were examined in carbamyl phosphate treated blood from normal individuals with hemoglobin A. The blood was treated in an identical manner to the treatment of Hb SS blood. Cells of normal individuals were selected for these preliminary studies in order to eliminate the variability associated with the high reticulocyte population usually found in sickle cell anemia. Results of the experiment are summarized in FIG. 2. In FIG. 2, the enzyme activity of red blood cells before and after incubation for 2 hours with carbamyl phosphate (8 moles/mole Hb) is shown. Normal range for this laboratory is indicated by the box. Points represent an average of three determinations on Hb AA individuals. The rbc enzyme activities sutidies were within the normal range. However, in all instances the activities of enzymes from the carbamyl phosphate treated cells were slightly lower than those of the untreated controls. It was established that the hemoglobin A molecules were changed as measured by electrophoretic mobility utilizing two different techniques: (1) Starch gel electrophoresis at ph 8.6 and (2) Agar electrophoresis at pH 6.2.

EXAMPLE 4

Figure 3:
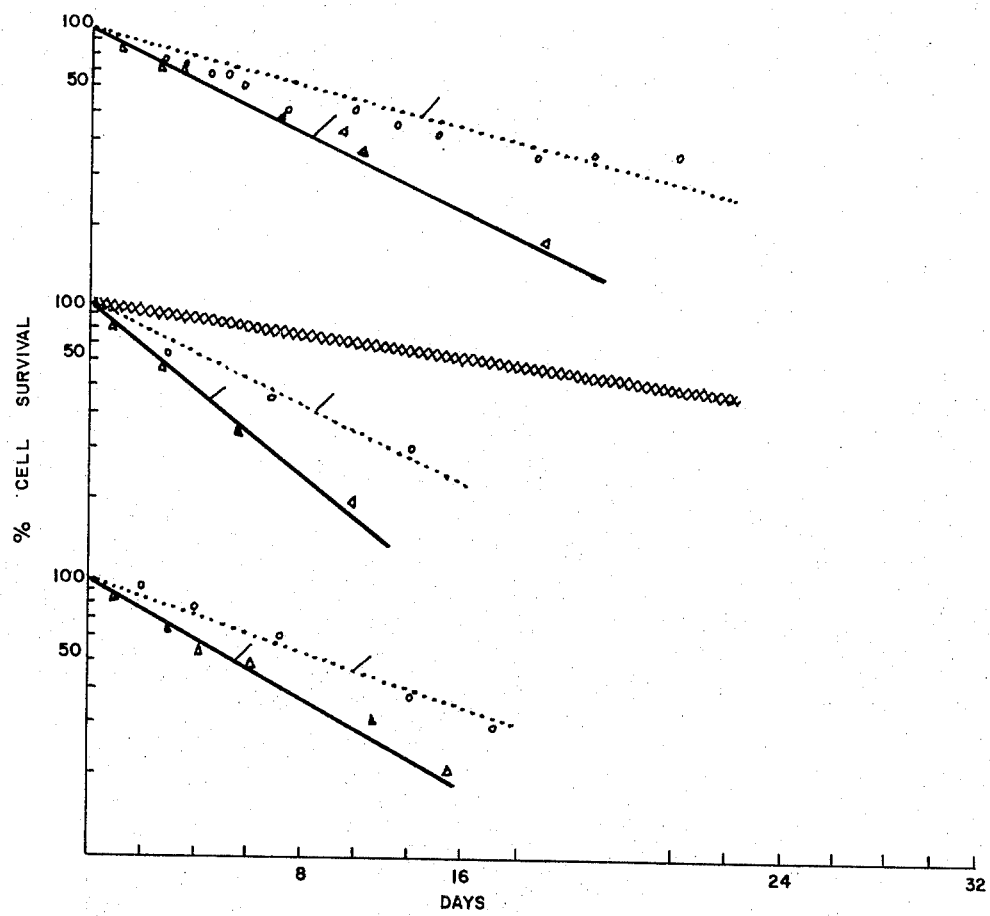

The maintenance of erythrocyte integrity as studied through $^{51}$Cr apparent half survival is shown in FIG. 3. The usual variability of cell survival in sickle cell anemia patients is depicted in the selection of the studies presented. In all instances the $^{51}$Cr apparent half survival of the erythrocytes doubled after treatment with carbamyl phosphate for 2 hours at 37°. The hemoglobin from these cells upon starch gel electrophoretic fractionation separated into two fractions, one with the mobility of HbS and a faster moving fraction with a mobility like that of HbA. In studies using $^{14}$C labeled carbamyl phosphate both these fractions are labeled.

In FIG. 3 the survival of rbc from whole blood treated for 2 hours, in vitro, with carbamyl phosphate (o) and labeled with $^{51}$Cr, as compared to untreated blood (Δ) is shown. Treated and untreated cells from the same sickle cell anemia patient are compared. Apparent half-survival is indicated by an arrow. Normal half-survival by this method is 30±2 days, as indicated by the broad line in the center graph.

phate treatment. When unlabeled cyanate is used with $^{14}$C carbamyl phosphate the distribution of radioactivity in the fractions is changed resulting in a marked decrease in the label in the fraction with the mobility of Hb SS. When $^{14}$C cyanate and unlabeled carbamyl phosphate are used simultaneously there appears to be an increase in radioactivity in the S' fraction which migrates like Hb A.

Figure 5:
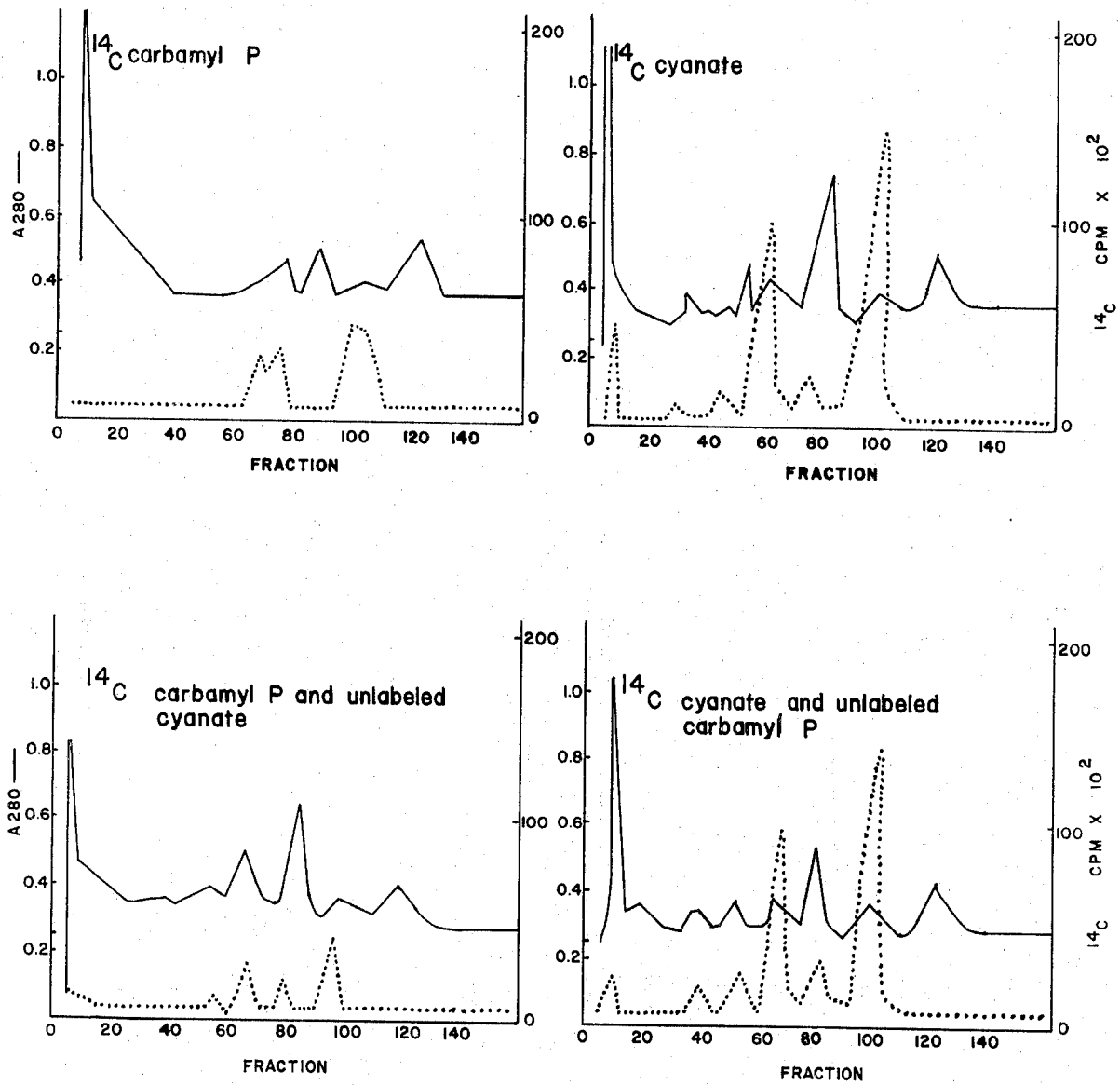

In order to examine the distribution of radioactivity in the polypeptide chains of hemoglobin S from blood treated with these reactants for 40 minutes, the chains were separated on Clegg columns with the results seen in FIG. 5. In table 4 the moles of $^{14}$C per mole of hemoglobin chain are listed. These figures reveal that carbamyl phosphate labels the pre-$\alpha$ chain three times more than the pre-$\beta$ chain. Dilution of $^{14}$C carbamyl phosphate with unlabeled cyanate decreases the pre-$\alpha$ chain label about one half but the pre-$\beta$ chain radioactivity remains about the same. $^{14}$C cyanate alone labels the pre-$\beta$ chain four to five times more than does $^{14}$C carbamyl phosphate, while the pre-$\alpha$ chain label is about one third less than that found with $^{14}$C carbamyl phosphate alone. $^{14}$C cynate used simultaneously with unlabeled carbamyl phosphate shows an increase in the pre-$\alpha$ chain radioactivity over that seen with $^{14}$C carbamyl phosphate alone and a decrease in pre-$\beta$ chain radioactivity from that found when $^{14}$C cyanate is used alone.

Table 4

Comparison of $^{14}$C incorporated into the $\alpha$ and $\beta$ chains of Hb SS from blood reacted with $^{14}$C carbamyl phosphate, $^{14}$C cyanate, $^{14}$C carbamyl phosphate and unlabeled cyanate or $^{14}$C cyanate and unlabeled carbamyl phosphate at 37° for 40 minutes at 8 moles of each reactant per mole of Hb.

| Reactant | Incorporation of moles of $^{14}$C per mole of chain | |
|---|---|---|
| | pre-$\beta$ chain | pre-$\alpha$ chain |
| $^{14}$C carbamyl | 0.06 | 0.20 |
| $^{14}$C carbamyl P and cyanate | 0.07 | 0.09 |
| $^{14}$C cyanate | 0.28 | 0.13 |
| $^{14}$C cyanate and carbamyl P | 0.18 | 0.22 |

EXAMPLE 5

In order to compare the action of carbamyl phosphate as an agent for molecular prosthesis and sickling inhibition with the action of cyanate, experimental conditions were selected where the phosphate effect as well as the cyanate effect of carbamyl phosphate could be measured. Therefore, one half life of the molecule was selected and treatment of whole blood was terminated at 40 minutes using $^{14}$C carbamyl phosphate alone, $^{14}$C cyanate alone, or $^{14}$C carbamyl phosphate with unlabeled cyanate or $^{14}$C cyanate with unlabeled carbamyl phosphate as reactants.

Figure 4:
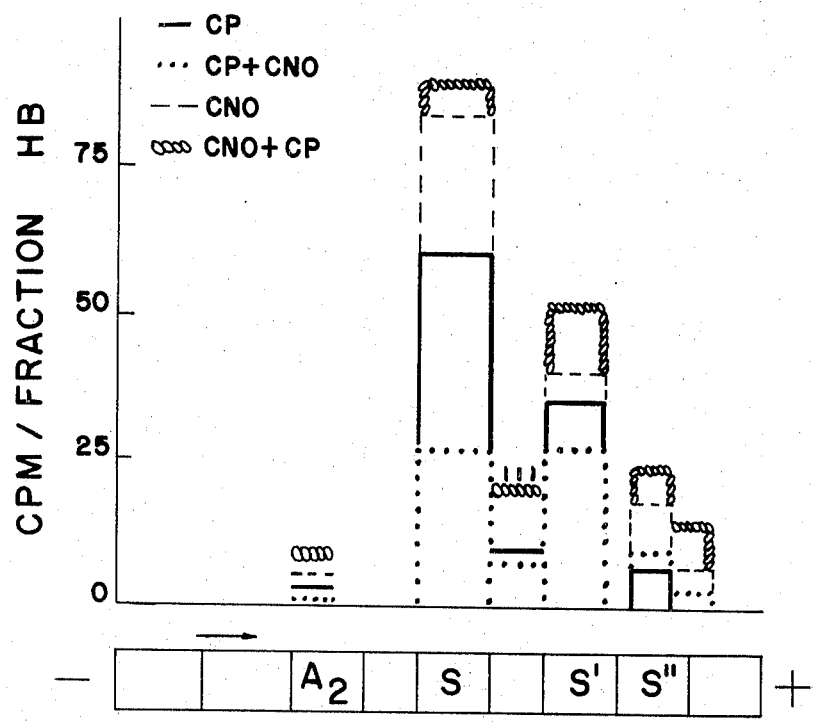
Figure 6:
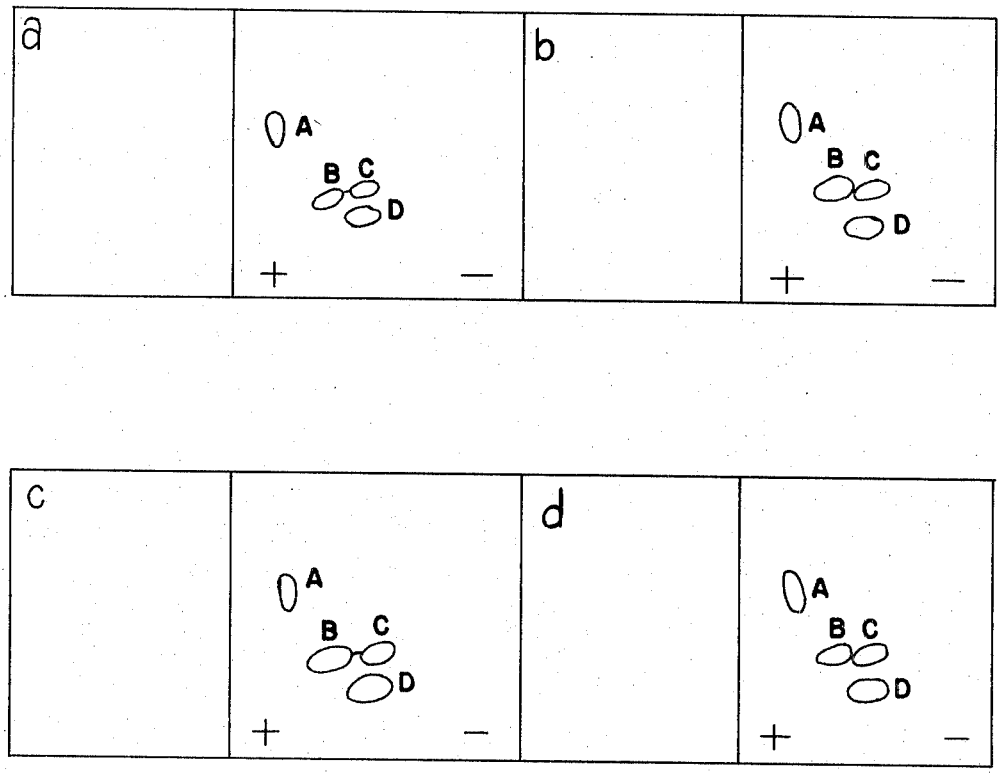

The hemoglobin resulting from these reactions was fractionated by starch gel electrophoresis and the distribution of the radioactivity in the hemoglobin S fractions is seen in FIG. 4 which shows distribution of radioactivity in Hb SS fractionated by starch gel electrophoresis using Tris-EDTA-Borate buffer at pH 8.6. The blood was incubated with carbamyl phosphate (CP) and/or cyanate (CNO). Compounds labeled with $^{14}$C indicated by *. With $^{14}$C cyanate treatment, there are three major labeled fractions of Hb SS, while there are only 2 Hb SS fractions labeled with $^{14}$C carbamyl phos- The radioactivity of peptides isolated from peptide maps of the soluble tryptic digest of total globin obtained from each differently reacted hemoglobin is seen in Table 5. The autoradiograms of the peptide maps are seen in FIG. 6. The peptide maps are of the soluble tryptic peptides of globin from blood incubated for 40 minutes at 37°C. with (a) $^{14}$C carbamyl phosphate; (b) $^{14}$C cyanate; (c) $^{14}$C carbamyl phosphate and unlabeled cyanate; (d) $^{14}$C and unlabeled carbamyl phosphate. The main radioactive peptides are designated A, B, C & D.

The four most radioactive peptides from the peptide maps are called A, B, C, and D. Amino acids analysis of these peptides and their location on the peptide maps indicate that these peptides appear to be the same peptides for each treated hemoglobin, however, the sensitivity of the peptides to $^{14}$C labeling varies, A having the most radioactivity of the four peptides with $^{14}$C carbamyl phosphate treatment, and D being more heavily labeled with $^{14}$C cyanate. When radioactive carbamyl phosphate and cold cyanate are present simultaneously, there is a decrease in the labeling of peptide A, but the others are essentially the same. When unlabeled carbamyl phosphate and $^{14}C$ cyanate are present simultaneously, the labeling pattern of the peptides changes, with a decrease in label in peptide D and an increase in label in peptide A and an increase in total radioactivity present.

Table 5

Comparison of the radioactivity of peptides isolated from peptide maps prepared from the soluble tryptic peptides of Hb SS after incubation of blood for 40 minutes at 37° with carbamyl phosphate (CP) or cyanate (CNO) alone or in combination (8 moles of reactant per mole of Hb).

| Peptide | *CP cpm | *CP CNO cpm | *CNO cpm | *CNO CP cpm |
|---------|---------|-------------|----------|-------------|
| A | 1110 | 367 | 1082 | 2096 |
| B | 660 | 486 | 1050 | 1436 |
| C | 328 | 377 | 566 | 858 |
| D | 456 | 502 | 1859 | 1127 |
| E | | | | 296 |
| F | | | | 114 |

*denotes labeling with $14_C$.

As stated above, it is known that the phosphate binding site for 2,3-DPG is on the amino terminal valine residues of the β chains of the hemoglobin tetramer. In the experiments using $^{14}C$ carbamyl phosphate, when half the carbamyl phosphate is still present as an affinity labeling reagent, the amount of $^{14}C$ incorporated into the β chain is one fourth that of the $^{14}C$ incorporated into the β chain when $^{14}C$ cyanate is used alone under the same conditions. This would indicate that a site on the β chain is blocked by carbamyl phosphate preventing carbamylation by cyanate. When $^{14}C$ carbamyl phosphate is diluted with unlabeled cyanate the $^{14}C$ incorporation in the β chain does not change, agreeing with the concept of a blocked site, but the α chain radioactivity is decreased suggesting that the sites of $^{14}C$ incorporation on the α chain may be reacted with cyanate or with carbamyl phosphate.

Again β chain site blockage is seen when unlabeled carbamyl phosphate and $^{14}C$ cyanate are present simultaneously, for there is a decrease in $^{14}C$ incorporated into the β chain with an increase in $^{14}C$ in the α chain similar to that found when $^{14}C$ is incorporated into α chain from $^{14}C$ carbamyl phosphate alone. Under these conditions, since one third of the cyanate present is unlabeled (coming from carbamyl phosphate), a dilution of α chain $^{14}C$ incorporation would be expected, however, the total moles of $^{14}C$ incorporated per tetramer (0.8) are the same as when $^{14}C$ cyanate alone is used. This is interpreted as indicating that carbamyl phosphate alters the conformation of the HB molecule thereby allowing increased reaction with cyanate. With only one half the $^{14}C$ incorporating capacity with $^{14}C$ carbamyl phosphate there is incorporation of greater than one half the expected moles of $^{14}C$ into the tetramer as compared with $^{14}C$ cyanate (0.52 moles as compared to 0.80 moles) again indicating that carbamyl phosphate changes the conformation of the molecule.

The distribution of radioactivity irreversibly bound to the soluble tryptic peptides confirms the above discussion. Whenever carbamyl phosphate (labeled or unlabeled) is present the radioactivity in the D peptide indicates that the D peptide is blocked to the level of carbamylation as found with $^{14}C$ cyanate alone. When the D peptide is blocked, the A peptide appears to be preferentially labeled. Also, simultaneous presence of unlabeled carbamyl phosphate with $^{14}C$ cyanate enhances the amount of $^{14}C$ incorporated into the molecule with increased radioactivity of peptides and additional peptides showing $^{14}C$ label indicating a conformational change through phosphate binding.

The erythrocyte from the sickle cell anemia patient has enhanced integrity after reaction with the affinity labeling agent, carbamyl phosphate. Carbamyl phosphate does not alter membrane bound blood group reactions, it does not alter red cell enzymes beyond the normal ranges of activity while it does inhibit the sickling phenomenon but, most important, it has increased the $^{51}Cr$ apparent half-survival of red cells two-fold using a 7 millimolar solution of carbamyl phosphate (8 moles/mole Hb). This is in contrast with the reported 50 millimolar incubation with cyanate giving the same two-fold extended survival time (Gillette et al. Proc. Nat. Acad. Sci. USA Vol. 68, p. 2791 (1971).

What is claimed is:

1. A method for the inhibition of the sickling of erythrocytes in the blood of humans containing hemoglobin S comprising incubating said blood *in vitro* with an amount of carbamyl phosphate and for a time sufficient to inhibit the sickling of said erythrocytes.

2. The method of claim 1 wherein a solution of carbamyl phosphate is incubated with whole blood from which a volume of plasma equivalent to the volume of said solution of carbamyl phosphate has been previously removed.

3. The method of claim 2 wherein the molar ratio of carbamyl phosphate to hemoglobin is in the range of from about 2:1 to about 8:1.

4. The method of claim 2, said whole blood having been stored for a period of from about 24 to about 48 hours after withdrawal from said human and prior to said incubation.

5. The method of claim 2 wherein said solution of carbamyl phosphate is a saline solution.

6. The method of claim 5 wherein said whole blood is incubated with a solution which is up to about 0.25 M with respect to carbamyl phosphate.

7. The method of claim 5 wherein said solution of carbamyl phosphate is incubated with whole blood containing substantially deoxygenated erythrocytes.

8. The method of claim 5 wherein said incubation is conducted at about 37°C.

9. The method of claim 5 wherein said incubation is conducted for from about 30 to about 120 minutes.

10. A method for the inhibition of the sickling of erythrocytes in the blood of humans containing hemoglobin S comprising incubating said blood in vitro with carbanyl phosphate wherein the molar ratio of carbamyl phosphate to hemoglobin is at least about 2:1 and the time of incubation is at least about 30 minutes.

* * * * *